United States Patent [19]
Ryoo et al.

[11] Patent Number: 5,942,208
[45] Date of Patent: Aug. 24, 1999

[54] MESOPOROUS MOLECULAR SIEVE SUBSTANCE AND METHOD FOR PREPARING THE SAME

[75] Inventors: Ryong Ryoo; Shin Ae Jun, both of Taejon, Rep. of Korea

[73] Assignee: Yu Kong Limited, Seoul, Rep. of Korea

[21] Appl. No.: 08/880,041

[22] Filed: Jun. 20, 1997

[51] Int. Cl.[6] ............................. C01B 33/20; C01B 33/26
[52] U.S. Cl. ......................... 423/705; 423/713; 423/326; 423/328.2; 423/335
[58] Field of Search ..................................... 423/701, 702, 423/704, 705, 713, 326, 328.1, 328.2, 335

[56] References Cited

U.S. PATENT DOCUMENTS

| | | |
|---|---|---|
| 5,057,296 | 10/1991 | Beck . |
| 5,102,643 | 4/1992 | Kresge et al. . |
| 5,156,829 | 10/1992 | McCullen et al. . |
| 5,211,934 | 5/1993 | Kresge et al. . |
| 5,308,602 | 5/1994 | Calabro et al. . |
| 5,589,153 | 12/1996 | Garces et al. . |
| 5,593,655 | 1/1997 | Jongkind et al. . |
| 5,695,735 | 12/1997 | Benazzi et al. . |

OTHER PUBLICATIONS

Ryoo et al., "Structural Order in MCM–41 Controlled by Shifting Silicate Polymerization Equilibrium," J. Chem. Soc. Chem. Commun., pp. 711–712, 1995 No Month.

Coustel et al., "Improved Stability of MCM–41 Through Textural Control," J. Chem Soc., Chem Commun., pp. 967–968, 1994 No Month.

Primary Examiner—Mark L. Bell
Assistant Examiner—David Sample
Attorney, Agent, or Firm—Seidel, Gonda, Lavorgna & Monaco, PC

[57] ABSTRACT

Mesoporous molecular sieve substances having a structure exhibiting a hexagonal arrangement of straight channels uniform in diameter, superior over MCM-41 substances of Mobil Co. in thermal stability and hydrothermal stability, can be prepared by the methods characterized in using various organic or inorganic salts.

13 Claims, 14 Drawing Sheets

MESOPOROUS MOLECULAR SIEVE SUBSTANCE AND METHOD FOR PREPARING THE SAME

BACKGROUND OF THE INVENTION

1. Field of the Invention

The present invention relates, in general, to a mesoporous molecular sieve substance and methods for preparing the same. More particularly, this invention relates to a mesoporous molecular sieve substance having a structure exhibiting a hexagonal arrangement of straight channels uniform in diameter, superior over MCM-41 manufactured by Mobil Co. in thermal stability and hydrothermal stability, and is concerned with methods for preparing the mesoporous molecular sieve substance.

2. Description of the Prior Art

Generally, porous substances are divided by pore size, for example, pore sizes smaller than 2 nm classified as microporous substances, between 2 and 50 nm classified as mesoporous substances and larger than 50 nm classified as macroporous substances. Of the porous substances, those having uniform channel, such as zeolite, are defined as molecular sieves and up to hundreds of types of species have been found and synthesized thus far. Zeolites play an important role as catalysts or carriers in modern chemical industries by virtue of their characteristics including selective adsorptivity, acidity and ion exchangeability. However, the molecular size of a reactant which can be utilized in catalyst conversion reactions, etc. is limited by the pore size of zeolite because zeolite is a microporous molecular sieve. For example, when ZSM-5 zeolite is applied in a catalytic cracking reaction, its reactivity becomes significantly decreased as the reactant changes from n-alkane to cycloalkane and further to branched alkane. Hence, an enormous effort has been made all over the world to synthesize molecular sieves having larger pores than that of zeolite. As a result, AlPO$_4$, VPI-5, Cloverlite and JDF-20 having larger pore size than that of zeolite were developed by many researchers. However, these molecular sieves cannot exceed the microporous limit.

Recently, a group of researchers in Mobil Co. reported a series of mesoporous molecular sieves, named MCM-41, in U.S. Pat. Nos. 5,057,296 and 5,102,643. According to these patents, MCM-41 has a structure exhibiting hexagonal arrangement of straight channels, such as honeycomb, on a silica plate. Recent research reports illustrate that MCM-41 is synthesized through a liquid crystal template pathway. That is, in an aqueous solution, surfactants form a liquid crystal structure which is surrounded by silicate ions and the liquid crystal structure is associated with MCM-41 substance via a hydrothermal reaction and then, removed by calcination at a temperature of 500 to 600° C., to prepare MCM-41. At this time, its pore size can be adjusted in a range of from 1.6 up to 10 nm by modulating the kinds of surfactants or synthesis conditions. Thus, MCM-41 is of mesoporosity with larger pore size than that of existing molecular sieves, such as zeolite, and is being actively researched for characterization and application in many laboratories. Since MCM-41 is a mesoporous molecular sieve, which has regularly arranged channels, it is used for study on adsorption characteristics of various gases as well as used as a carrier for conductive polymer, organometallic compound and poly acid by virtue of its large pores. Further, another type MCM-41 whose framework atoms are partly substituted with other elements, such as aluminum, boron, manganese, iron, vanadium, titanium, etc, has been developed for application to apply for a catalytic reactions of macro organic compound or for use in catalytic carriers.

As mentioned above, the application examples of MCM-41 in various fields are reported. However, one of the most important physical properties of MCM-41 for the application is thermal stability. According to the early researchers, after being subjected to calcination to remove template materials, MCM-41 samples undergo structure contraction ranging from 20 to 25% relative to pre-calcination, although exhibiting a little difference depending on synthesis conditions. This contraction is attributed to the fact that the silanol groups are condensed by the calcination. However, recent research data shows that, if the equilibrium of silicate condensation reaction is moved toward the product by controlling pH of the reactants during the hydrothermal synthesis of MCM-41, the condensation of the silanol group is already completed, so that the weak thermal stability can be surmounted and a considerable improvement can be brought into the uniformity of structure. The MCM-41 thus obtained was reportedly found not to undergo structural decomposition even at 500° C. under 1 atm in the presence of 100% water vapor, in addition to being only slightly contracted in structure even upon heating up to 900° C. under an oxygen atmosphere.

Superior in thermal stability as it is, the MCM-41, however, starts to be slowly destructurized in water heated at 60° C. or higher, which is ascribed to the hydrolysis of the silicate constituents. 12 hrs after being heated in boiling water of 100° C., the MCM-41 completely loses its structural characteristics. This poor hydrothermal stability serves as a serious limiting factor in the case of requiring 60° C. or higher, for example, in using a titanium-substituted molecular sieve in a partial oxidation reaction, in a catalyst conversion reaction needing a hydrothermal condition in which hydrogen peroxide is used as an oxidizing agent or in impregnating in the molecular sieve a transition metal, such as platinum, as a catalytically active ingredient.

Therefore, active research and development efforts have been made for an improvement in the hydrothermal stability of mesoporous molecular sieves.

SUMMARY OF THE INVENTION

Therefore, it is an object of the present invention to overcome the above problems encountered in the prior art and to provide a method for preparing a novel mesoporous molecular sieve substance significantly improved in hydrothermal stability.

It is another object of the present invention to provide the novel mesoporous molecular sieve substance.

In accordance with an aspect of the present invention, there is provided a method for preparing a mesoporous molecular sieve substance, comprising the steps of:

(A) mixing an aqueous ammonia solution, a silicate, and an alkyltrimethylammonium halide as a surfactant, represented by the following formula I:

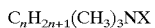

$$C_nH_{2n+1}(CH_3)_3NX \qquad\qquad I$$

wherein n is an integer of 12 to 18 and X is Cl or Br, to prepare a mixed aqueous solution;

(B) subjecting the mixed aqueous solution to hydrothermal reaction, adjusting its pH and re-subjecting it to hydrothermal reaction;

(C) adding in the mixed aqueous solution one or more water-soluble organic or inorganic salts which are capable of binding to a monovalent cation;

(D) repeating the procedure of step (B);

(E) subjecting the reaction solution to hydrothermal reaction for a suitable period at a suitable temperature while maintaining its pH, so as to give precipitates of desired molecular sieve substances;

(F) filtering, washing and drying the precipitates of the molecular sieve substances; and (G) calcining the dried precipitates.

In accordance with another aspect of the present invention, there is provided a method for preparing a mesoporous molecular sieve substance, comprising the steps of:

(1) mixing an aqueous ammonia solution, a silicate, one or more salts selected from the group consisting of aluminates, borates and acid salts of 3$d$ transition metals on the periodic table and an alkyltrimethyl ammonium halide as a surfactant, represented by the formula I:

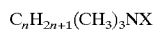

$$C_nH_{2n+1}(CH_3)_3NX \qquad I$$

wherein n is an integer of 12 to 18 and X is Cl or Br, to prepare a mixed aqueous solution;

(2) subjecting the mixed aqueous solution to hydrothermal reaction, adjusting its pH and re-subjecting it to hydrothermal reaction;

(3) adding in the mixed aqueous solution one or more water-soluble organic or inorganic salts which are capable of binding to a monovalent cation;

(4) repeating the procedure of step (2);

(5) subjecting the reaction solution to hydrothermal reaction for a suitable period at a suitable temperature while maintaining its pH, so as to give precipitates of desired molecular sieve substances;

(6) filtering, washing and drying the precipitates of the molecular sieve substances; and (7) calcining the dried precipitates.

In accordance with a further aspect of the present invention, there are provided mesoporous molecular sieve substances, prepared by the above methods, having a structure exhibiting a hexagonal arrangement of straight channels uniform in diameter.

BRIEF DESCRIPTION OF THE DRAWINGS

Other objectives and aspects of the invention will become apparent from the following description of embodiments with reference to the accompanying drawings in which.

DETAILED DESCRIPTION OF THE INVENTION

Figure 1:
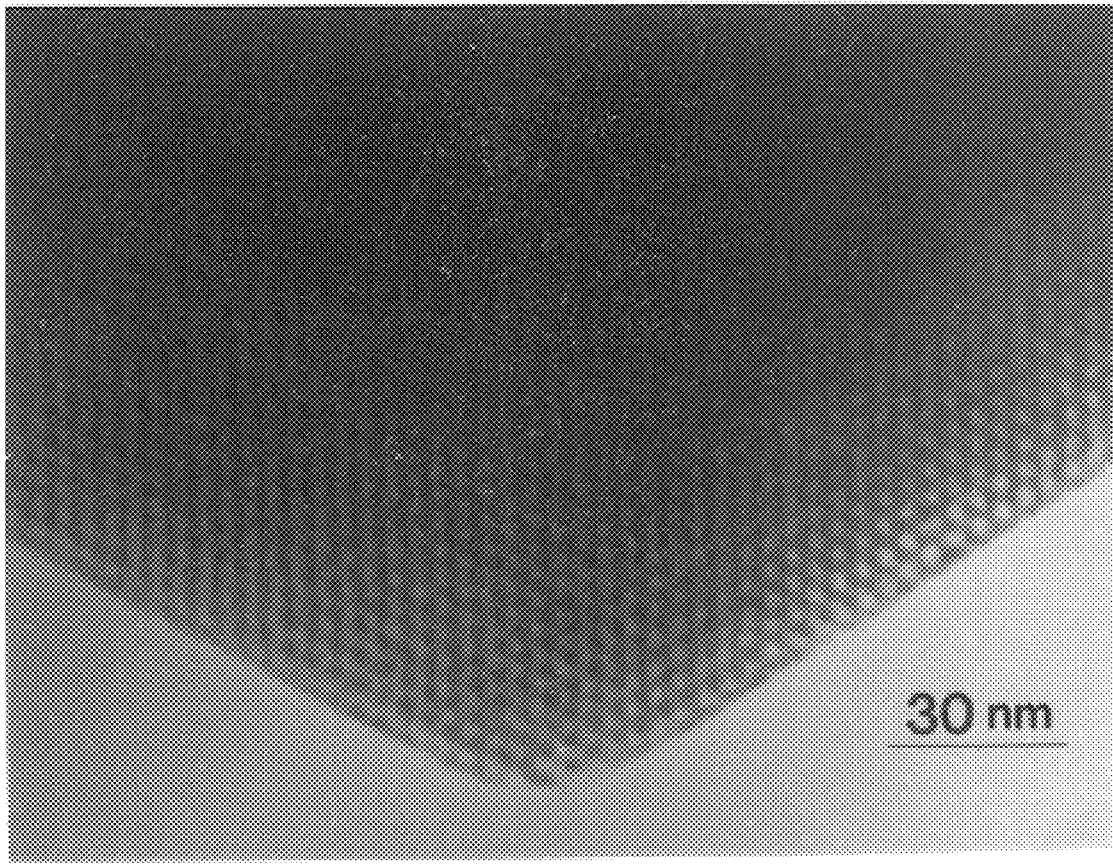
FIG. 1 is a transmission electronic microphotograph showing KIT-3 substance prepared in accordance with an embodiment of the present invention.

MCM-41, a mesoporous molecular sieve, is prepared through a liquid crystal template passage using surfactant as a structure-inducing material. Various preparation methods of MCM-41 have been reported in recent years. In the present invention, there is provided a novel molecular sieve KIT-3 based on the method disclosed in J. Chem. Soc., Chem. Commun., 1995, at 711, authored by the present inventors.

As a surfactant used in the present invention, alkyltrimethylammonium halide of the formula I is used. Preferred are dodecyltrimethylammonium bromide (DTABr), tetradecyltrimethyl ammonium bromide (TTABr), hexadecyltrimethylammonium chloride (HTACl), and octadecyltrimethyl ammonium bromide (OTABr).

In the methods according to the present invention, the silicate used in steps (A) and (1) may be an aqueous sodium silicate solution (Na/Si=0.5) which is obtained by dissolving a colloid silica, such as that sold by DuPont under the tradename of "Ludox HS40" (40 wt % $SiO_2$) in a 1 M sodium hydroxide, but is not limited to this.

An example of one or more salts selected from the group consisting of aluminates, borates and acid salts of the 3$d$ transition metal on the periodic table, used in step (1), includes sodium aluminate ($NaAlO_2$).

According to the preparation method for KIT-3, the pH of the reactant solutions is controlled three times to, for example, 10.2 by neutralization with a weak acid, for example, acetic acid. The present invention is characterized in that, after the first pH controlling step, a hydrothermal reaction is carried out, followed by addition of salts. This allows for a significantly improved molecular sieve in thermal stability and hydrothermal stability. That is, in contrast with co-pending U.S. Pat. application Ser. No. 08/788,159, filed Jan. 24, 1997, to the present assignee, the content of which is incorporated herein by reference, the present invention additionally comprises the two hydrothermal reactions and pH control as in the step (B) or (2) and the addition of salt as in step (C) or (3), resulting in the production of a mesoporous substance quite different in pore structure from that of the above prior U.S. patent application. While the mesoporous substance of the above prior U.S. patent application is structurized in such a manner that channels uniform in diameter are randomly arranged interconnecting with one another in a three-dimensional way, that of the present invention is structured in such a way that uniform mesopores show a hexagonal arrangement of straight channels, such as honeycomb.

Well known to the experts in the art, the term "hydrothermal reaction" as used herein refers to a reaction in water while heating in an open or closed reactor.

The organic or inorganic salts used in the steps (C) and (3) are those that are able to bind to monovalent cations, such as $Li^+$, $Na^+$, $K^+$, $Rb^+$ and $NH_4^+$, and also dissolve in water. Preferred examples include LiCl, NaCl, KCl, RbCl, $CH_3COONa$, NaBr, $CH_3COOK$, $Na_2SO_4$, $NaNO_3$, $NaClO_4$, $NaClO_3$, ethylenediamine tetraacetic acid tetrasodium salt ($EDTANa_4$), adipic acid disodium salt, 1,3-benzendisulfonic acid disodium salt and nitrilotriacetic acid sodium salt.

In steps (A) and (1), the silicate is preferably used at an amount of 1.0 to 15.0 moles per mole of alkyltrimethylammonium halide. The aqueous ammonia solution serves to smoothly promote the function of the surfactant and may be not used in some cases. In step (1), the salt selected from the group consisting of aluminum acid salts, boron acid salts, the acid salts of the 3d transition metal on the periodic table and the combinations thereof, is preferably added in a range of 0.0025 to 0.4 moles based on one mole of the alkyltrimethylammonium halide of the formula I.

In steps (B) and (2), the hydrothermal reaction is suitably carried out at a temperature of 80 to 120° C. for a time of 1 to 2 days. The hydrothermal reactions in the other steps are conducted under the same conditions.

In steps (C) and (3), the water-soluble organic or inorganic salt capable of forming a bond with monovalent cation is preferably used in an amount of 0.5 to 16.0 moles per mole of the alkyltrimethylammonium halide of the formula I.

It is preferable that the calcination of the final step be carried out at 500 to 600° C. in air.

A detailed description will be given of KIT-3 below, in conjugation with the accompanying drawings.

FIG. 1 is a transmission electron micrograph showing the KIT-3 substance prepared from a reaction comprising $SiO_2:HTACl:Na_2O:(NH_4)_2O:H_2O$ (molar ratio, 4:1:1:0.15:200) in the following Example I. As shown in FIG. 1, the KIT-3 substance has a structure in which mesopores are in a hexagonal arrangement of straight channels, such as honeycomb. Similar electron microphotographs could be obtained from all of the other KIT-3 substances prepared in the present invention.

Figure 2:
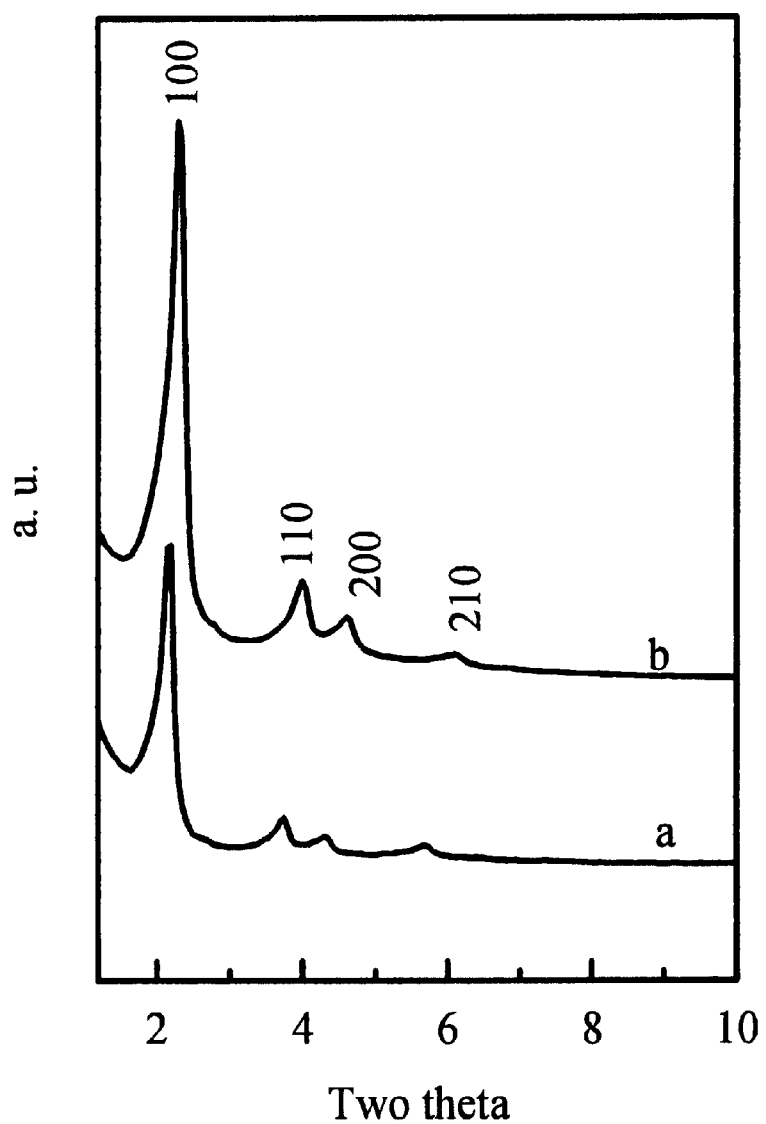
FIG. 2 shows X-ray diffraction patterns obtained from the KIT-3 substance of FIG. 1.

FIG. 2 shows X-ray diffraction patterns of the KIT-3 substances of FIG. 1, in which reference character "a" stands for KIT-3 substance before calcination and reference character "b" for KIT-3 substance after calcination. In the X-ray diffraction patterns, the peaks showing the hexagonal arrangement can be read in low angle ranges, irrespective of calcination and designated as (100), (110), (200), (210) and (300).

Figure 3:
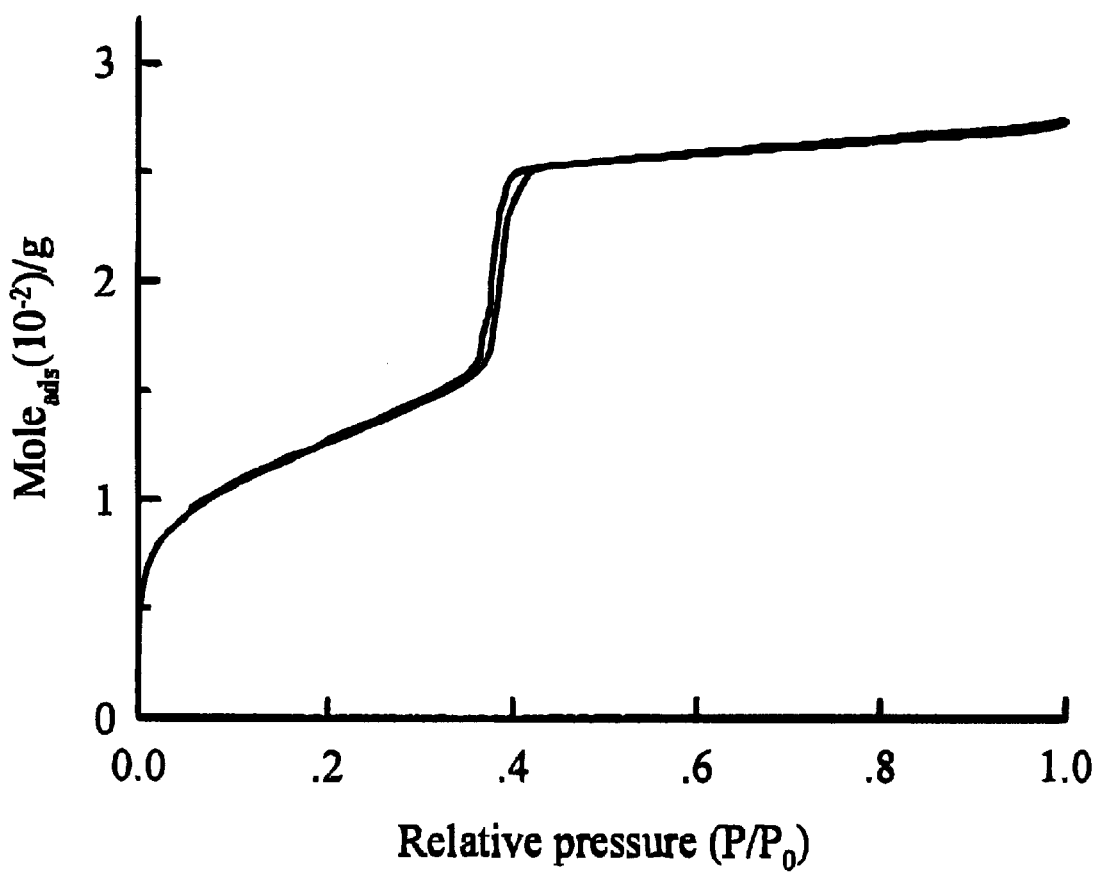
FIG. 3 shows $N_2$ adsorption-desorption isotherms at liquid $N_2$ temperature for the KIT-3 substance of FIG. 2 after calcination.

FIG. 3 shows nitrogen adsorption-desorption isotherms at liquid nitrogen temperatures for the KIT-3 of FIG. 1 which has undergone the calcination of Example I. According to these isotherms, the nitrogen adsorption is abruptly increased around 0.4 of $P/P_0$.

Figure 4:
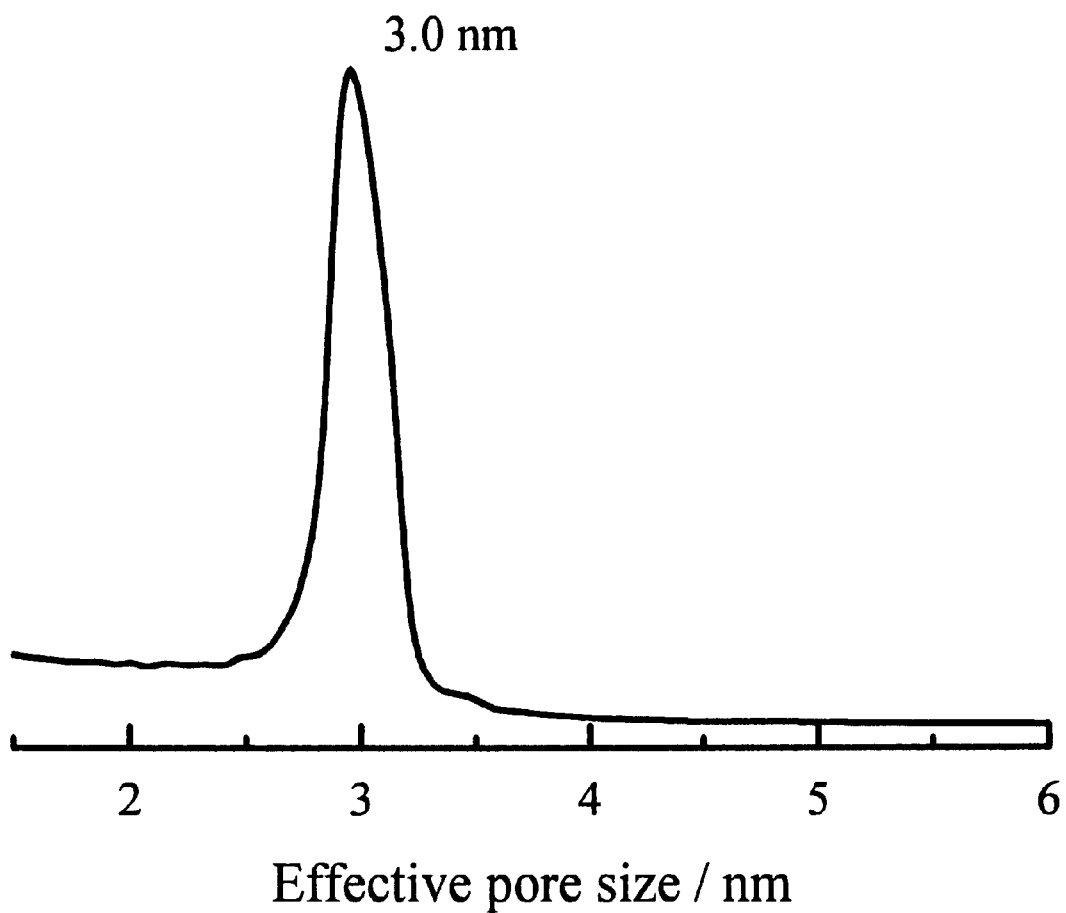
FIG. 4 shows the pore size distribution curve for the KIT-3 substance, obtained from $N_2$ adsorption-desorption isotherms of FIG. 3 by means of the Horvath-Kawazoe method.
Figure 5:
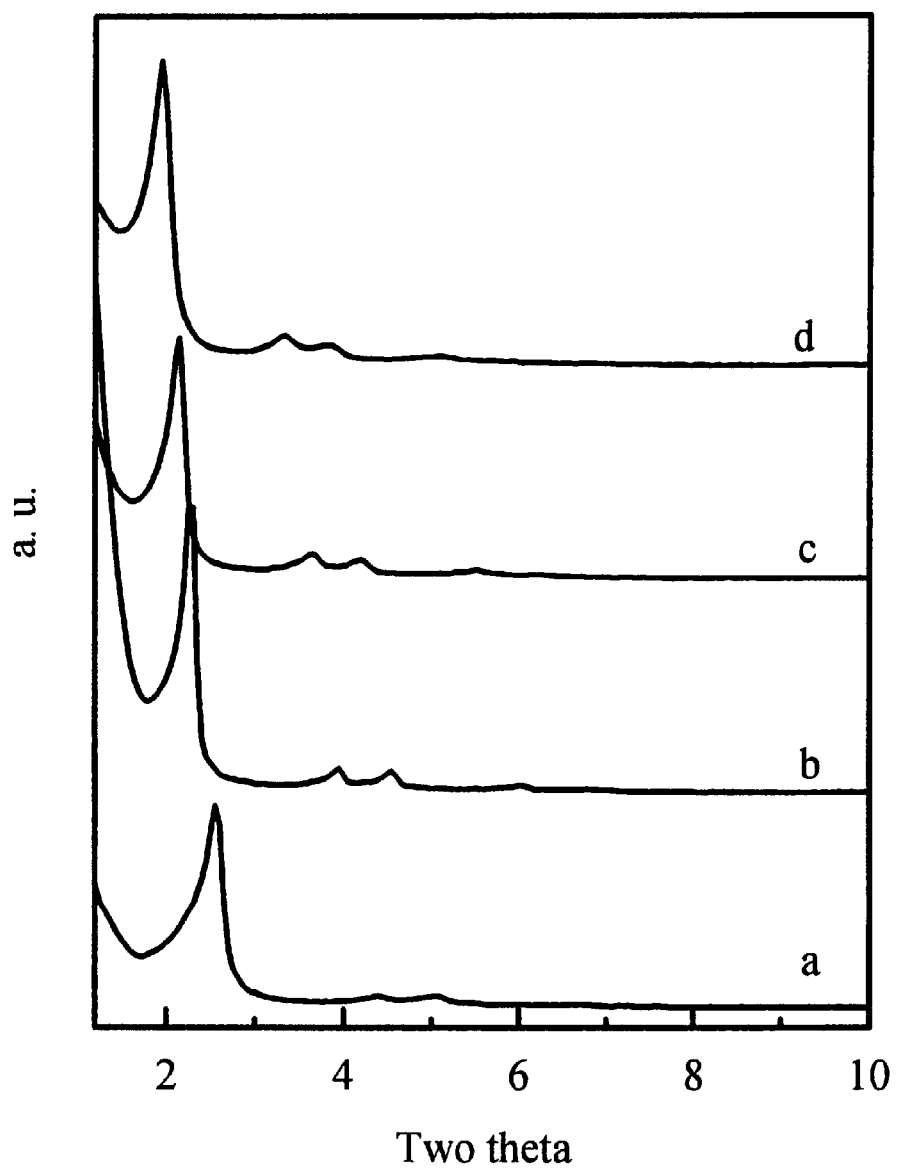
FIG. 5 shows the change in the X-ray diffraction pattern of KIT-3 substance with the alkyl chain length of alkyltrimethylammonium halide, a surfactant used in Example I.

FIG. 4 shows a size distribution curve for the channels of KIT-3, obtained from the nitrogen adsorption-desorption isotherms at liquid nitrogen temperature by the Horvath-Kawazoe method. As seen, the channels of KIT-3 are of quite narrow size distribution at 3.0 nm (the line width is not more than 1 nm at medium height). Similar curves (not shown) could be obtained by such nitrogen adsorption-desorption, irrespective of the kinds of salt used during the synthesis of the KIT-3. Referring to FIG. 5, there are X-ray diffraction plots showing the change of $d_{100}$ with the alkyl chain length of the formula I surfactant. The salt used for this synthesis of KIT-3 was $EDTANa_4$ which was added at 8 moles per mole of surfactant. As seen in FIG. 5, $d_{100}$ of the X-ray diffraction patterns increases from 2.5 to 4.6 nm regularly as the alkyl chain length of the formula I surfactant extends from 12 for "a" through 14 for "b" to 16 for "c" and then, to 18 for "d".

With reference to FIGS. 6 through 12, there are shown X-ray diffraction patterns that are dependent on the salts added during the synthesis of KIT-3, which include $EDTANa_4$, $CH_3COONa$, LiCl, NaCl, KCl, $NaNO_3$, and $Na_2SO_4$. In these figures, the X-ray diffraction patterns on the left panel are for the KIT-3 obtained by calcining KIT-3 substances and then removing surfactant from them, whereas the patterns on the right panel are for the KIT-3 obtained by calcining KIT-3 substances and then immersing them in boiling water for 12 hrs.

Figure 6:
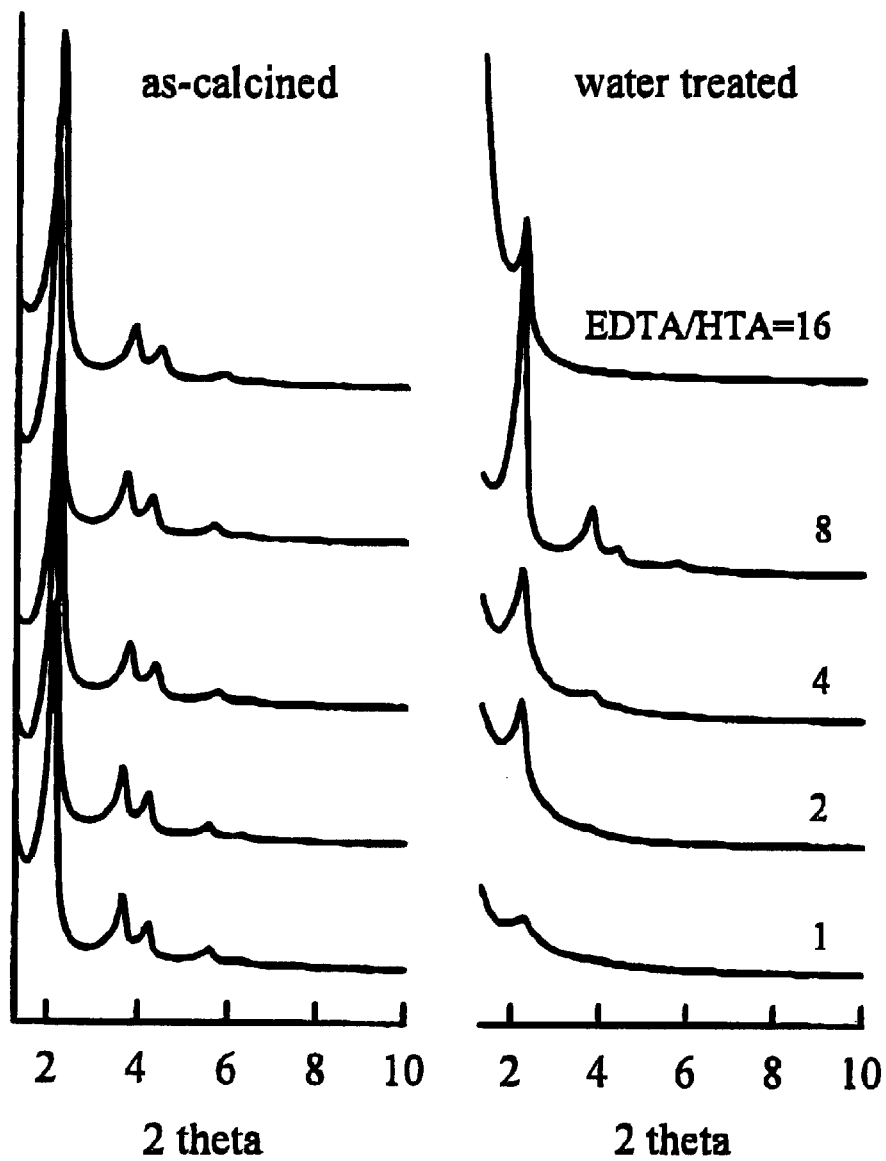
FIG. 6 shows X-ray diffraction patterns of the KIT-3 substance prepared by using $EDTANa_4$ as a salt in Example II.
Figure 7:
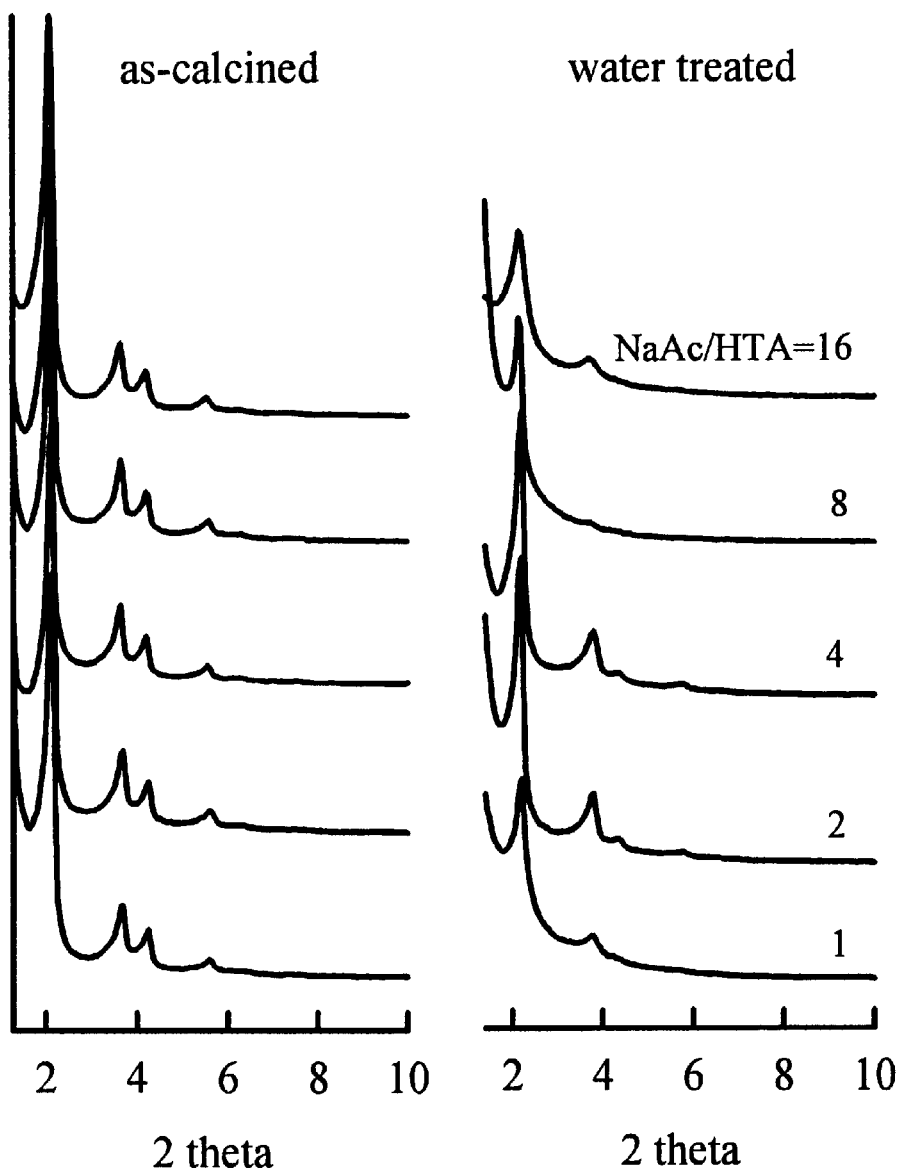
FIG. 7 shows X-ray diffraction patterns of the KIT-3 substance prepared by using $CH_3COONa$ as a salt in Example III.
Figure 8:
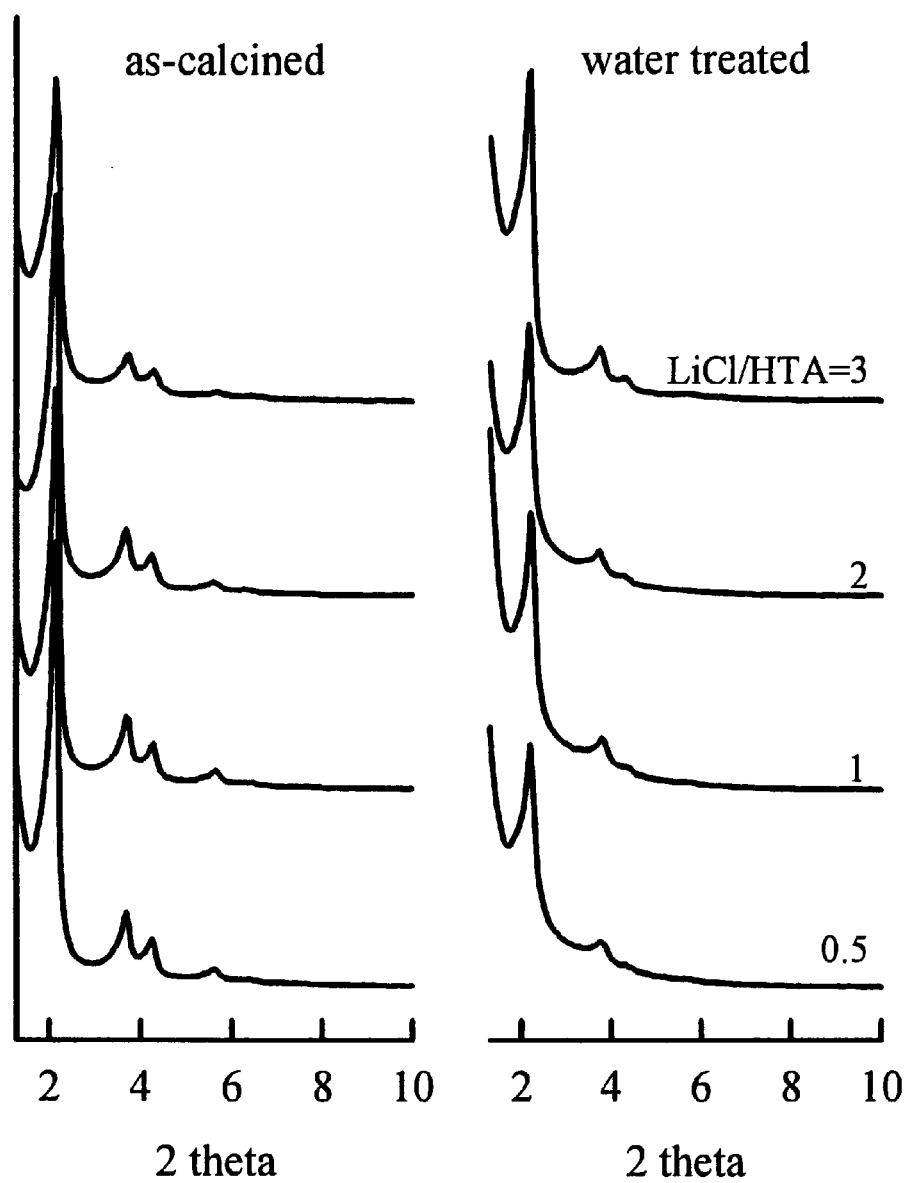
FIG. 8 shows X-ray diffraction patterns of the KIT-3 substance prepared by using LiCl as a salt in Example IV.
Figure 9:
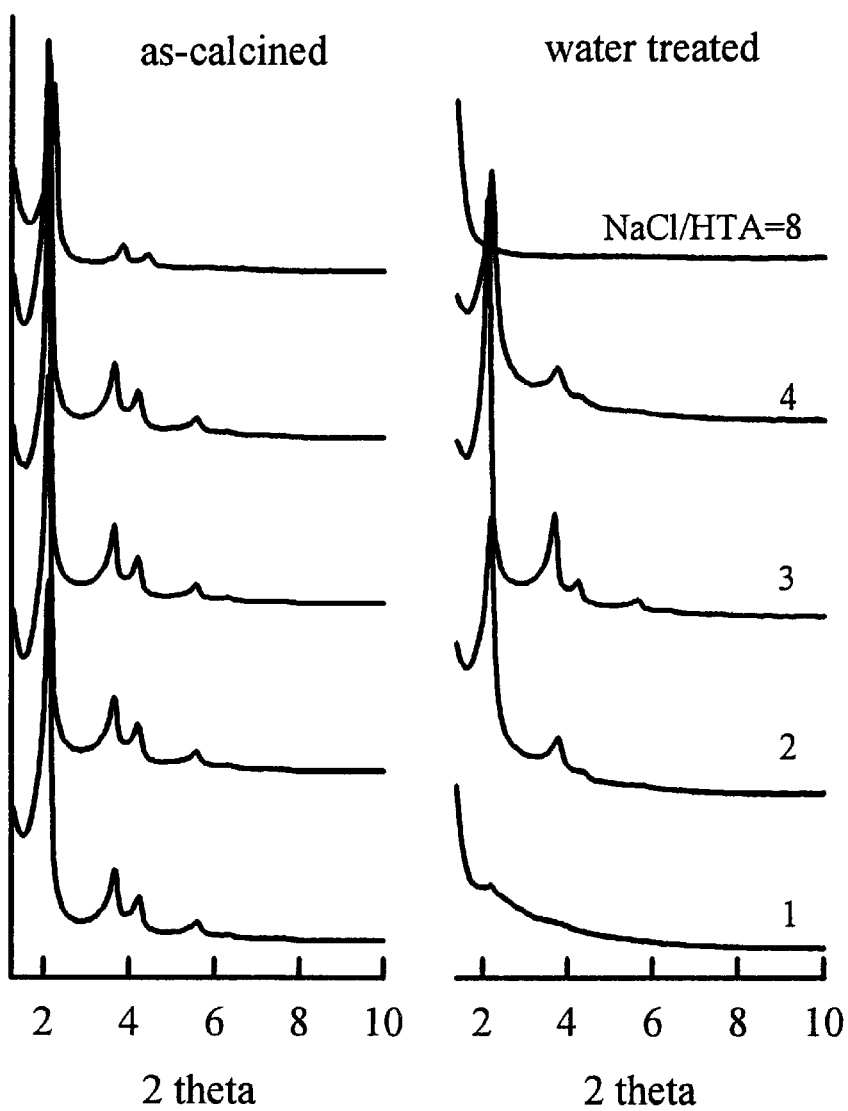
FIG. 9 shows X-ray diffraction patterns of the KIT-3 substance prepared by using NaCl as a salt in Example V.
Figure 10:
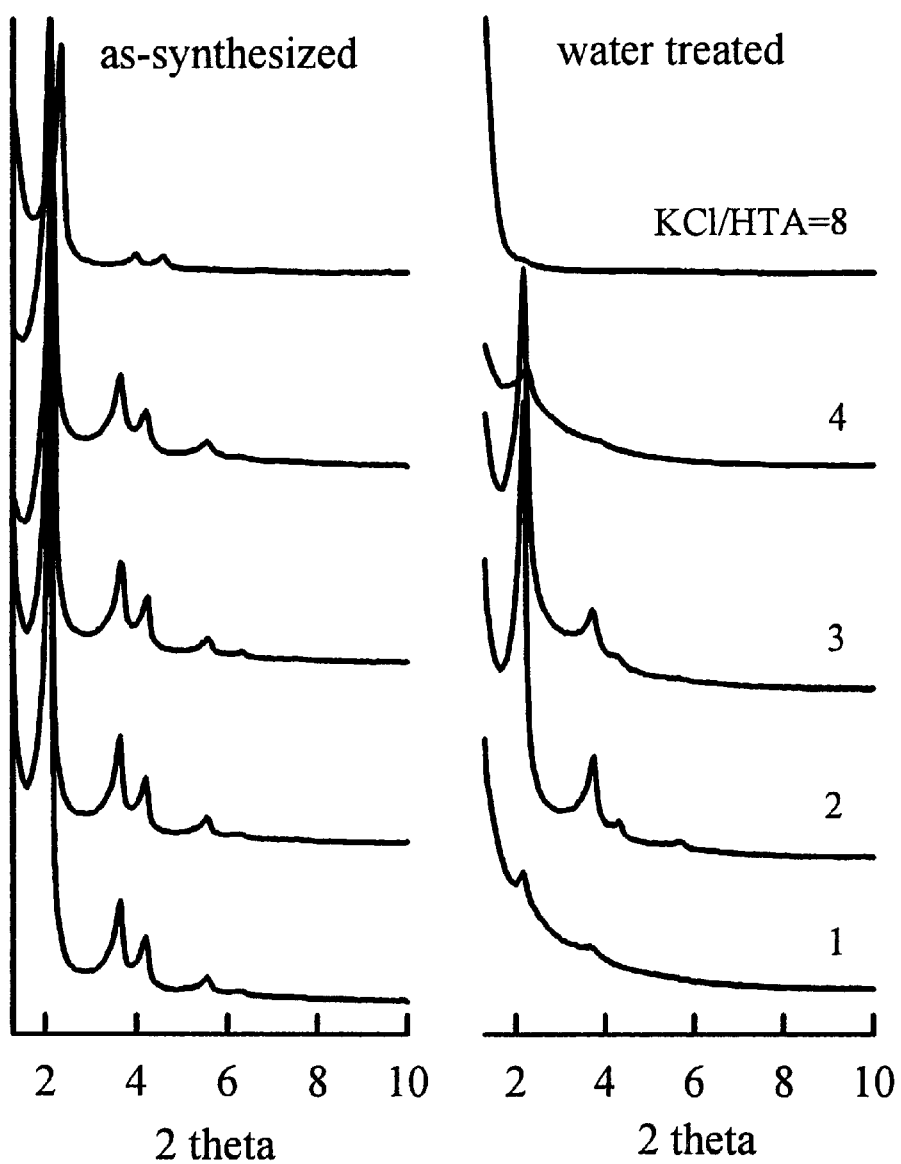
FIG. 10 shows X-ray diffraction patterns of the KIT-3 substance prepared by using KCl as a salt in Example VI.
Figure 11:
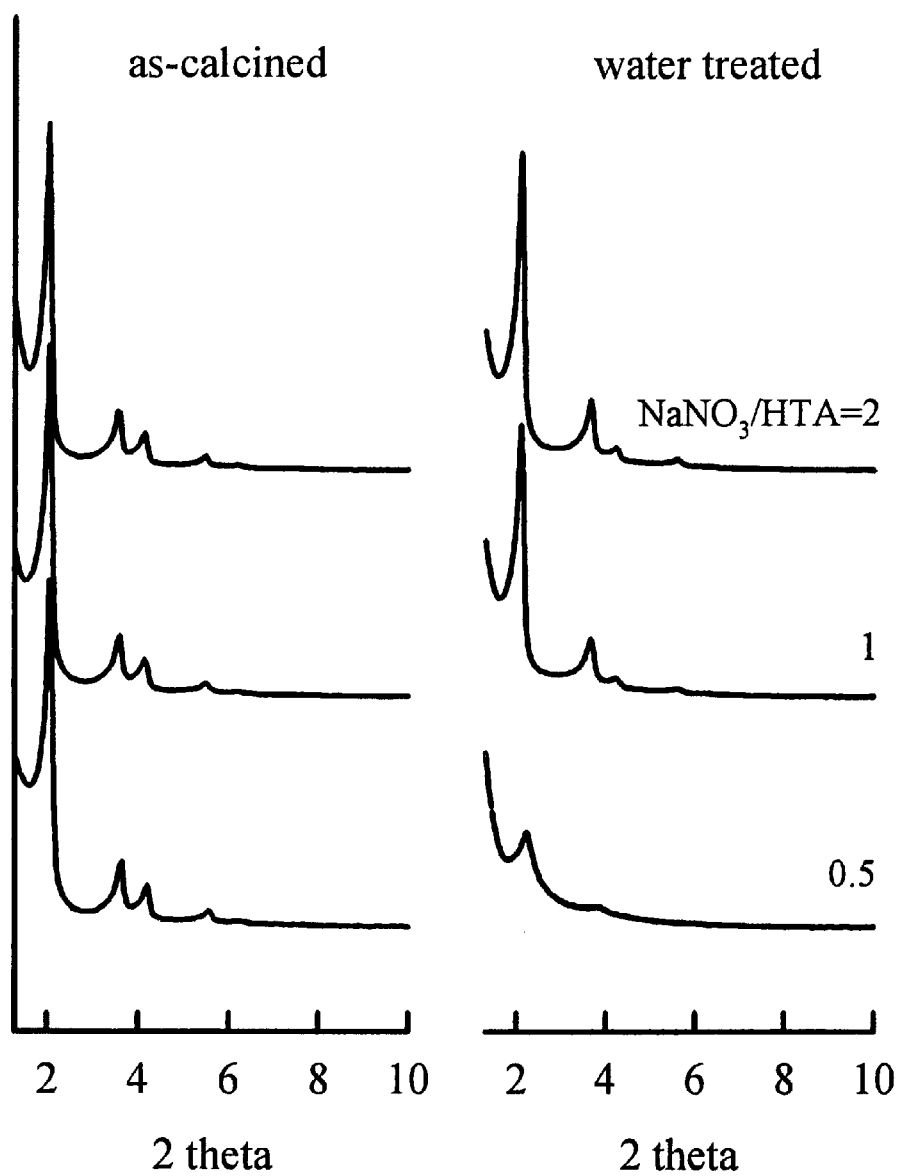
FIG. 11 shows X-ray diffraction patterns of the KIT-3 substance prepared by using $NaNO_3$ as a salt in Example VII.
Figure 12:
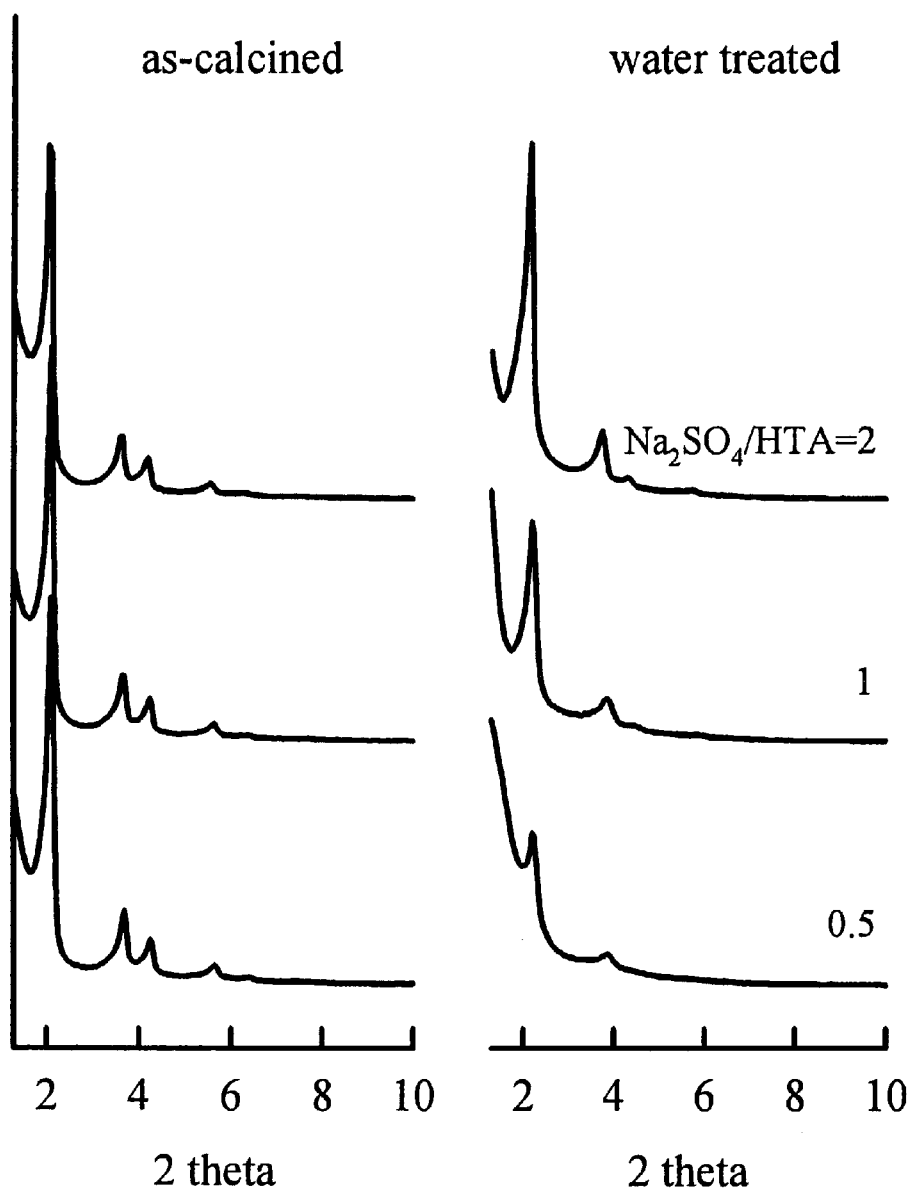
FIG. 12 shows X-ray diffraction patterns of the KIT-3 substance prepared by using $Na_2SO_4$ as a salt in Example VIII.

FIG. 6 is the synthesis results of KIT-3 using $EDTANa_4$. As will be illustrated in Example II later, the X-ray diffraction patterns of KIT-3 after the samples are calcined, followed by the removal of surfactant from them, are on the left panel whereas the patterns after the samples are calcined, followed by subjecting them to hydrothermal reaction for 12 hrs are on the right panel. The numerals on the patterns in the figure represent the mole number of $EDTANa_4$ added per mole of hexadecyl trimethylammonium, a surfactant. In this case, $EDTANa_4$ is used at an amount of 0 to 16 moles per mole of the surfactant. As apparent from the figure, the KIT-3 synthesized without using any salt is completely destructurized when it is immersed in boiling water for 12 hrs. On the other hand, the addition of the salt during the synthesis of KIT-3 results in stabilizing the structure of the corresponding KIT-3. That is, as seen, the hydrothermal stability of the structure increases as the mole ratio of the $EDTANa_4$ to the surfactant increases to a certain value, for example, 8. The mole ratio higher than such optimal value, on the contrary, makes the hydrothermal stability have a tendency to decrease. This case will be, in detail, illustrated in Example II, later.

In FIGS. 7 through 12, there are displayed the X-ray diffraction patterns of the KIT-3 which are obtained by using as a salt $CH_3COONa$, LiCl, NaCl, KCl, $NaNO_3$ and $Na_2SO_4$, respectively, and calcining the corresponding KIT-3 substances, as will be described in Examples III through VIII, respectively. The diffraction patterns on the left panel in these figures are obtained from the calcined substances while the patterns on the right panel from the calcined substances but further processed through the hydrothermal treatment in boiling water for 12 hrs. As in FIG. 6, the numerals on the patterns each mean the mole number of the salt added per mole of hexadecyltrimethyl ammonium chloride, a surfactant. Like FIG. 6, FIGS. 7 through 12 show that, as the salts are added at more amounts, the hydrothermal stability becomes increased to the extent beyond which the hydrothermal stability declines. For each case, when 2 moles of $CH_3COONa$, 3 moles of LiCl, 3 moles of NaCl, 2 moles of KCl, 2 moles of $NaNO_3$, 2 moles of $Na_2SO_4$ per mole of hexadecyl trimethylammonium chloride were added, the hydrothermal stability of the corresponding KIT-3 was found to have maximal hydrothermal stability.

In the following Example IX, parts of silicon present in the frame of the mesoporous molecular sieve KIT-3 were substituted by aluminum, resulting in a different mesoporous molecular sieve, named "AlKIT-3" (Si/Al=10 to 200). In this synthesis, EDTANa$_4$ was added. The X-ray diffraction pattern (not shown) thereof shows that the structure of AlKIT-3 is identical to that of KIT-3.

Figure 13:
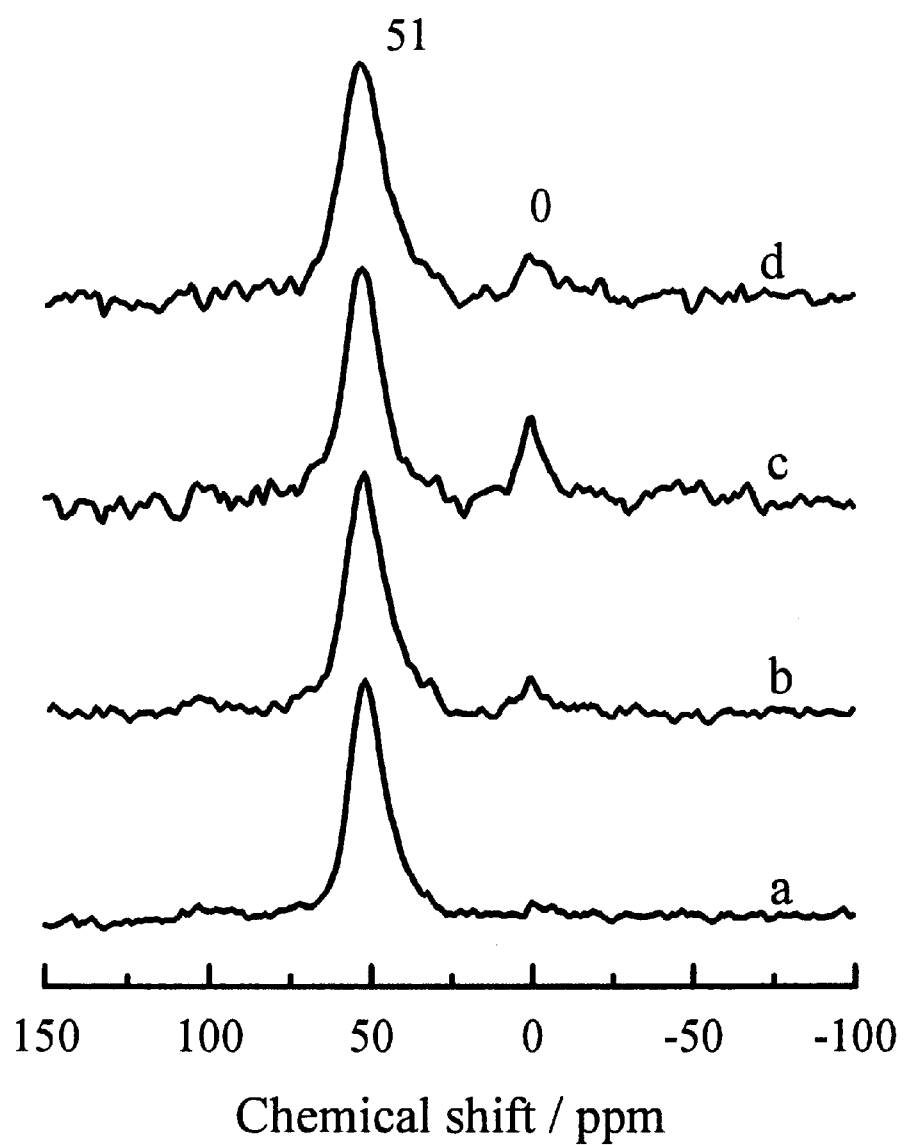
FIG. 13 shows solid phase MAS aluminum-27 NMR spectra of AlKIT-3 substance, in which aluminum is partly substituted for frame silicon (Si/Al=40), according to various treatments.
Figure 14:
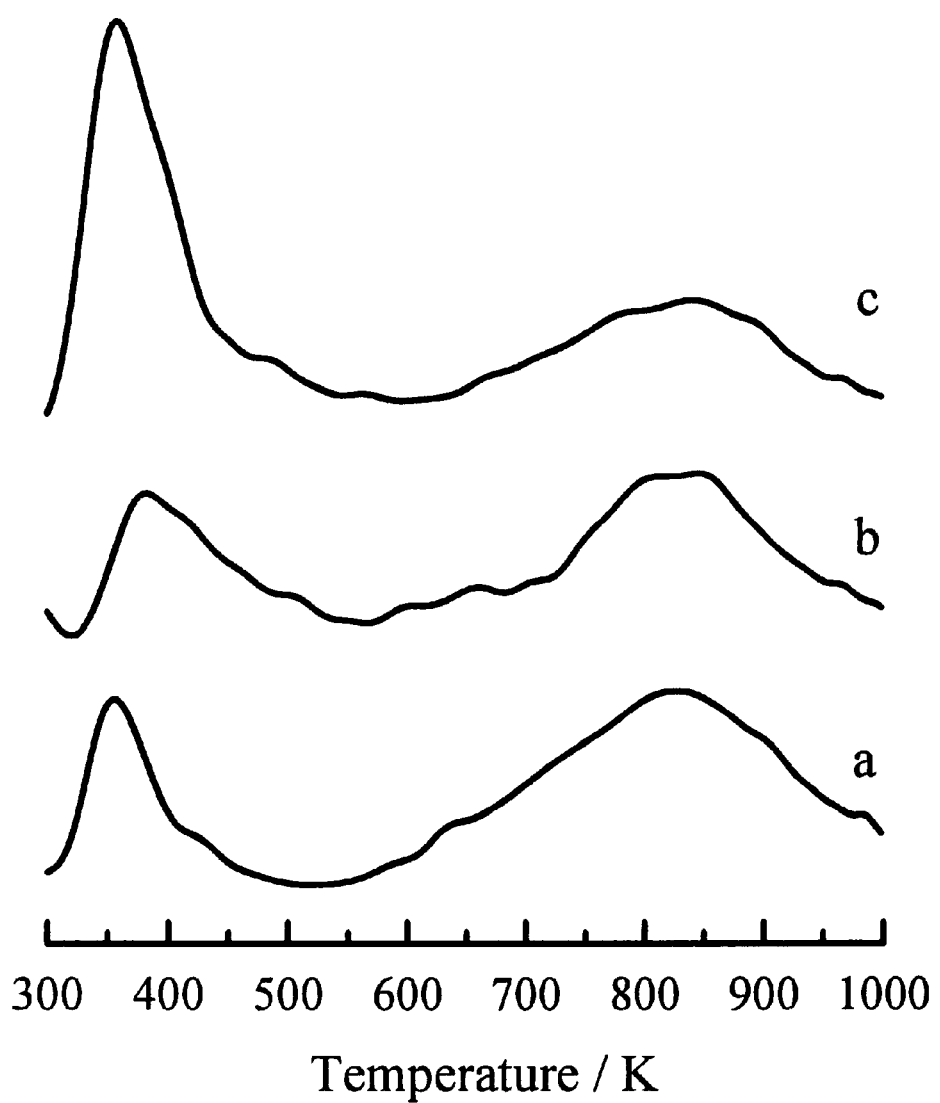
FIG. 14 shows temperature programmed desorption (TPD) results of ammonia gas for AlKIT-3 substance (Si/Al=40), according to various treatments.

With reference to FIGS. 13 and 14, the results obtained from the test of AlKIT-3 (Si/Al=40) for thermal stability and hydrothermal stability are shown. FIG. 13 is solid phase magic angle spin (MAS) aluminum-27 nuclear magnetic resonance (NMR) for the AlKIT-3 obtained before calcination (a), after calcination (b), after temperature was maintained at 500° C. for 2 hrs under an oxygen atmosphere with a water vapor of 2.3 kPa (c), and after being placed in boiling water of 100° C. for 12 hrs (d). As demonstrated in FIG. 13, AlKIT-3, like KIT-3, is not able to be destructured by the above thermal or hydrothermal treatments by virtue of the salt added, but AlKIT-3 also allows the substituted aluminum in the frame to maintain the tetrahedral structure of the mesoporous sieve. In addition, FIG. 14 is temperature programmed desorption (TPD) of ammonia for the AlKIT-3 obtained after calcination (a), after temperature was maintained at 500° C. for 2 hrs under an oxygen atmosphere with a water vapor of 2.3 kPa (b), and after being placed in boiling water of 100° C. for 12 hrs (c). As seen in FIG. 14, AlKIT-3 has almost the same acid point after calcination (a), even after being treated at 500° C. for 2 hrs under an oxygen atmosphere with a water vapor of 2.3 kPa (b) or after being placed in boiling water of 100° C. for 12 hrs (c). Consequently, AlKIT-3 is superior in hydrothermal stability as well as thermal stability.

A better understanding of the present invention may be obtained in light of following examples which are set forth to illustrate, but are not to be construed to limit, the present invention.

EXAMPLE I

In this example, KIT-3 was synthesized by using, as a surfactant, alkyltrimethylammonium halide (ATAX) having an alkyl chain length of 12, 14, 16 and 18.

0.29 g of 28 wt % ammonia solution in water was mixed with the amounts as indicated in Table 1 below of 25 wt % aqueous dodecyltrimethylammonium bromide (DTABr) solution, 25 wt % aqueous tetradecyltrimethylammonium bromide (TTABr) solution, 25 wt % aqueous hexadecyl trimethylammonium chloride (HTACl) solution and 25 wt % aqueous octadecyltrimethylammonium (OTABr) solution each, to give Solution A. Separately, 9.4 g of Ludox (trade name of DuPont, colloid silica) was mixed with 33.8 g of 1.0 M sodium hydroxide in water and heated at 80° C. for 2 hrs to give Solution B. Solution C was prepared by adjusting the pH of 33.3 wt % ethylene diamineacetic acid tetrasodium salt to 11 with 0.01 M sodium hydroxide solution.

Solution B was added dropwise to a polypropylene bottle containing Solution A while vigorously stirring it with a magnetic stirrer for 1 hr at room temperature. In this mixture, the mole ratio of $SiO_2$:ATAX:$(NH_4)_2O$:$H_2O$ was 4:1:0.15:200. This mixture was subjected to reaction at 100° C. for 1 day and then, cooled to room temperature. Dropwise adding 30 wt % acetic acid solution, the reaction mixture was titrated to have pH 10.2. Again, it was subjected to reaction at 100° C. for 1 day, cooled to room temperature and then, added with 140 g of Solution C to increase the mole number of EDTANa$_4$ to 8 per mole of the alkyltrimethylammonium halide in the resulting solution. The procedure of reacting at 100° C. for 1 days, cooling to room temperature and titrating to pH 10.2 was repeated twice more for the solution. The precipitate thus obtained was washed with 2° distilled water and dried at 100° C. To remove the surfactant from the dried sample, calcination was carried out at 540° C. for 10 hr.

The resulting KIT-3 substances all provided the similar X-ray diffraction patterns as shown in FIG. 1. The change of $d_{100}$ with the alkyl chain length of the surfactant is given as shown in FIG. 5 and Table 1 below. From nitrogen adsorption, the specific surface areas were obtained to be 1,000±50 $m^2g^{-1}$ following BET method and each are given as shown in Table 1.

TABLE 1

$d_{100}$ and Surface Area According to Chain Length of Surfactant

| Surfactant | Amount of EDTANa$_4$ aqueous Sol'n (g) | $d_{100}$(nm) | Specific Surface Area ($m^2g^{-1}$) |
|---|---|---|---|
| DTABr | 19.3 | 3.74 | 976 |
| TTABr | 21.0 | 3.93 | 995 |
| HTACl | 20.0 | 4.21 | 1004 |
| OTABr | 24.5 | 4.50 | 1024 |

EXAMPLE II

Solution A was prepared by mixing 20 g of 25 wt % aqueous hexadecyltrimethyl ammonium chloride (HTACl) with 0.29 g of 28 wt % aqueous ammonia solution while Solution B and Solution C were such an aqueous sodium silicate solution and the 33.3 wt % EDTANa$_4$ solution, respectively, as used in Example I. Solution C was used at the amounts as indicated in Table 2 below. The same synthetic procedure with Example I was repeated. Thus, the resulting reaction mixture had a composition of 4 $SiO_2$:1 HTACl:1 $Na_2O$:0.15 $(NH_4)_2O$:x EDTANa$_4$:y $H_2O$ wherein $0 \leq x \leq 16$ and $200 \leq y \leq 900$. The X-ray diffraction patterns obtained from the KIT-3 substances calcined and further treated in boiling water for 12 hrs are given in FIG. 6.

TABLE 2

The Amount of aqueous EDTANa$_4$ Solution used

| EDTANa$_4$/HTACl | 33.3 wt % EDTANa$_4$ aqueous Sol'n (g) |
|---|---|
| 1 | 17.8 |
| 2 | 35.6 |
| 4 | 71.3 |
| 8 | 142.6 |
| 16 | 258.2 |

EXAMPLE III

The same Solution A and Solution B as those of Example II were used. As a Solution C, 27.0 wt % $CH_3COONa$ solution was employed with the amounts as indicated in Table 3 below. The same synthetic procedure with Example I was repeated. Thus, the resulting reaction mixture had a composition of 4 $SiO_2$:1 HTACl:1 $Na_2O$:0.15 $(NH_4)_2O$:x $CH_3COONa$:y $H_2O$ wherein $0 \leq x \leq 16$ and $200 \leq y \leq 400$. The X-ray diffraction patterns obtained from the KIT-3 substances calcined and further treated in boiling water for 12 hrs are given in FIG. 7.

TABLE 3

The Amount of aqueous CH₃COONa Solution used

| CH₃COONa/HTACl | 27.0 wt % CH₃COONa aqueous Sol'n (g) |
|---|---|
| 1 | 4.9 |
| 2 | 9.7 |
| 4 | 19.5 |
| 8 | 38.9 |
| 16 | 77.8 |

EXAMPLE IV

The same Solution A and Solution B as those in Example II were used. As a Solution C, 20.0 wt % lithium chloride (LiCl) solution was employed with the amount as indicated in Table 4 below. The same synthetic procedure with Example I was repeated. Thus, the resulting reaction mixture had a composition of 4 $SiO_2$:1 HTACl:1 $Na_2O$:0.15 $(NH_4)_2O$:x LiCl:y $H_2O$ wherein $0 \leq x \leq 3$ and $200 \leq y \leq 230$. The X-ray diffraction patterns obtained from the KIT-3 substances calcined and further treated in boiling water for 12 hrs are given in FIG. 8.

TABLE 4

The Amount of aqueous LiCl Solution used

| LiCl/HTACl | 20.0 wt % LiCl aqueous Sol'n (g) |
|---|---|
| 0.5 | 3.4 |
| 1 | 6.8 |
| 2 | 13.6 |
| 3 | 20.4 |

EXAMPLE V

The same Solution A and Solution B as those in Example II were used. As a Solution C, 25.0 wt % sodium chloride (NaCl) solution was employed with the amount as indicated in Table 5 below. The same synthetic procedure with Example I was repeated. Thus, the resulting reaction mixture had a composition of 4 $SiO_2$:1 HTACl:1 $Na_2O$:0.15 $(NH_4)_2O$:x NaCl:y $H_2O$ wherein $0 \leq x \leq 8$ and $200 \leq y \leq 280$. The X-ray diffraction patterns obtained from the KIT-3 substances calcined and further treated in boiling water for 12 hrs are given in FIG. 9.

TABLE 5

The Amount of aqueous NaCl Solution used

| NaCl/HTACl | 25 wt % NaCl aqueous Sol'n (g) |
|---|---|
| 1 | 3.65 |
| 2 | 7.30 |
| 3 | 10.95 |
| 4 | 14.60 |
| 8 | 29.20 |

EXAMPLE VI

The same Solution A and Solution B as those in Example II were used. As a Solution C, 20.0 wt % potassium chloride (KCl) solution was employed with the amount as indicated in Table 6 below. The same synthetic procedure with Example I was repeated. Thus, the resulting reaction mixture had a composition of 4 $SiO_2$:1 HTACl:1 $Na_2O$:0.15 $(NH_4)_2O$:x KCl:y $H_2O$ wherein $0 \leq x \leq 8$ and $200 \leq y \leq 350$. The X-ray diffraction patterns obtained from the KIT-3 substances calcined and further treated in boiling water for 12 hrs are given in FIG. 10.

TABLE 6

The Amount of aqueous KCl Solution used

| KCl/HTACl | 20 wt % KCl aqueous Sol'n (g) |
|---|---|
| 1 | 5.9 |
| 2 | 11.8 |
| 3 | 17.7 |
| 4 | 23.6 |
| 8 | 47.2 |

EXAMPLE VII

The same Solution A and Solution B as those in Example II were used. As a Solution C, 25.0 wt % sodium nitrate (KCl) solution was employed with the amount as indicated in Table 7 below. The same synthetic procedure with Example I was repeated. Thus, the resulting reaction mixture had a composition of 4 $SiO_2$:1 HTACl:1 $Na_2O$:0.15 $(NH_4)_2O$:x $NaNO_3$:y $H_2O$ wherein $0 \leq x \leq 2$ and $200 \leq y \leq 280$. The X-ray diffraction patterns obtained from the KIT-3 substances calcined and further treated in boiling water for 12 hrs are given in FIG. 11.

TABLE 7

The Amount of aqueous NaNO₃ Solution used

| NaNO₃/HTACl | 25 wt % NaNO₃ aqueous Sol'n (g) |
|---|---|
| 0.5 | 1.83 |
| 1 | 3.65 |
| 2 | 7.30 |

EXAMPLE VIII

The same Solution A and Solution B as those in Example II were used. As a Solution C, 9.2 wt % sodium sulfate ($Na_2SO_4$) solution was employed with the amount as indicated in Table 8 below. The same synthetic procedure with Example I was repeated. Thus, the resulting reaction mixture had a composition of 4 $SiO_2$:1 HTACl:1 $Na_2O$:0.15 $(NH_4)_2O$:x $Na_2SO_4$:y $H_2O$ wherein $0 \leq x \leq 2$ and $200 \leq y \leq 360$. The X-ray diffraction patterns obtained from the KIT-3 substances calcined and further treated in boiling water for 12 hrs are given in FIG. 12.

TABLE 8

The Amount of aqueous Na₂SO₄ Solution used

| Na₂SO₄/HTACl | 9.2 wt % Na₂SO₄ aqueous Sol'n (g) |
|---|---|
| 0.5 | 3 |
| 1 | 6 |
| 2 | 12 |

EXAMPLE IX

The same Solution A, Solution B and Solution C as those in Example II was used. In addition, Solution D of 5.0 wt % sodium aluminate ($NaAlO_2$) was employed with the amount as indicated in Table 9 below. The reaction mixture of Solution A and Solution B was stirred for 1 hr at room temperature, slowly added dropwise with Solution D and then, stirred for another one hour. Except for this, the same synthetic procedure with Example I was repeated. Thus, the resulting reaction mixture had a composition of 4 $SiO_2$:1 HTACl:1 $Na_2O$:0.15 $(NH_4)_2O$:2/x $Al_2O_3$:y $H_2O$ wherein $10 \leq x \leq 200$ and $200 \leq y \leq 220$. A hydrothermal reaction at 100° C. for 2 days was made to the reaction mixture.

TABLE 9

The Amount of aqueous $NaAlO_2$ Solution used

| Si/Al | 5.0 wt % $NaAlO_2$ aqueous Sol'n (g) |
|---|---|
| 10 | 11.1 |
| 20 | 5.57 |
| 40 | 2.79 |
| 100 | 1.11 |
| 150 | 0.74 |
| 200 | 0.56 |

Taken together, the data suggested in the Examples reveals that the mesoporous molecular sieve KIT-3 and its derivative AlKIT-3, characterized in the addition of salt, is of far superior thermal stability and hydrothermal stability compared with conventional mesoporous molecular sieves.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A method for preparing a mesoporous molecular sieve substance, comprising the steps of:

(A) mixing an aqueous ammonia solution, a silicate, and an alkyltrimethylammonium halide as a surfactant, represented by the following formula I:

$$C_nH_{2n+1}(CH_3)_3NX \qquad I$$

where n is an integer of 12 to 18 and X is Cl or Br, to prepare a mixed aqueous solution;

(B) subjecting the mixed aqueous solution formed in step (A) to hydrothermal reaction, adjusting its pH and re-subjecting it to hydrothermal reaction to prepare a hydrothermally treated aqueous solution;

(C) adding to the hydrothermally treated solution of step (B) one or more water-soluble organic or inorganic salts which are capable of binding to a monovalent cation;

(D) subjecting the solution resulting from step (C) to hydrothermal reaction, adjusting its pH and re-subjecting to hydrothermal reaction;

(E) subjecting the solution resulting from step (D) to hydrothermal reaction for a suitable period at a suitable temperature while maintaining its pH, so as to give precipitates of a molecular sieve substance;

(F) filtering, washing and drying the precipitates of the molecular sieve substance; and (G) calcining the dried precipitates.

2. The method in accordance with claim 1, wherein said surfactant is selected from the group consisting of hexadecyltrimethylammonium chloride, dodecyltrimethyl ammonium bromide, tetradecyltrimethylammonium bromide and octadecyltrimethylammonium bromide.

3. The method in accordance with claim 1, wherein said silicate is sodium silicate.

4. The method in accordance with claim 1, wherein said water-soluble organic or inorganic salts are selected from the group consisting of LiCl, NaCl, KCl, RbCl, $CH_3COONa$, NaBr, $CH_3COOK$, $Na_2SO_4$, $NaNO_3$, $NaClO_4$, $NaClO_3$, ethylenediaminetetraacetic acid tetrasodium salt, adipic acid disodium salt, 1,3-benzenedisulfonic acid disodium salt and nitrilotriacetic acid sodium salt.

5. The method in accordance with claim 1, wherein said water-soluble organic or inorganic salts and said silicate were used at an amount of 0.5 to 16.0 moles and 1.0 to 15.0 moles, respectively, per mole of the alkyltrimethylammonium halide of the formula I.

6. The method in accordance with claim 1, wherein said calcining step is carried out at a temperature of 500 to 600° C.

7. A method for preparing a mesoporous molecular sieve substance, comprising the steps of:

(1) mixing an aqueous ammonia solution, a silicate, one or more salts selected from the group consisting of aluminates, borates and acid salts of 3d transition metals on the periodic table and an alkyltrimethylammonium halide as a surfactant, represented by the following formula I:

$$C_nH_{2n+1}(CH_3)_3NX \qquad I$$

wherein n is an integer of 12 to 18 and X is Cl or Br, to prepare a mixed aqueous solution;

(2) subjecting the mixed aqueous solution formed in step (1) to hydrothermal reaction, adjusting its pH and re-subjecting it to hydrothermal reaction to prepare a hydrothermally treated solution;

(3) adding to the hydrothermally treated solution of step (2) one or more water-soluble organic or inorganic salts which are capable of binding to a monovalent cation;

(4) subjecting the solution resulting from step (3) to hydrothermal reaction, adjusting its pH and re-subjecting to hydrothermal reaction;

(5) subjecting the solution resulting from step (4) to hydrothermal reaction for a suitable period at a suitable temperature while maintaining its pH, so as to give precipitates of a molecular sieve substance;

(6) filtering, washing and drying the precipitates of the molecular sieve substance; and (7) calcining the dried precipitates.

8. The method in accordance with claim 7, wherein said aluminate is sodium aluminate.

9. The method in accordance with claim 7, wherein said water-soluble organic or inorganic salts, said silicate and one or more salts selected from the group consisting of aluminates, borates and acid salts of 3d transition metals on periodic table were used at an amount of 0.5 to 16.0 moles, 1.0 to 15.0 moles and 0.0025 to 0.40 mole, respectively, per mole of the alkyl trimethylammonium halide of the formula I.

10. The method in accordance with claim 7, wherein said surfactant is selected from the group consisting of hexadecyltrimethylammonium chloride, dodecyltrimethyl ammonium bromide, tetradecyltrimethylammonium bromide and octadecyltrimethylammonium bromide.

11. The method in accordance with claim 7, wherein said silicate is sodium silicate.

12. The method in accordance with claim 7, wherein said water-soluble organic or inorganic salts are selected from the group consisting of LiCl, NaCl, KCl, RbCl, $CH_3COONa$, NaBr, $CH_3COOK$, $Na_2SO_4$, $NaNO_3$, $NaClO_4$, $NaClO_3$, ethylenediaminetetraacetic acid tetrasodium salt, adipic acid disodium salt, 1,3-benzenedisulfonic acid disodium salt and nitrilotriacetic acid sodium salt.

13. The method in accordance with claim 7, wherein said calcining step is carried out at a temperature of 500 to 600° C.

* * * * *